(12) United States Patent
Boulkenafed (10) Patent No.: US 10,630,497 B2
(45) Date of Patent: Apr. 21, 2020

(54) COMMUNICATION MIDDLEWARE FOR MANAGING MULTICAST CHANNELS

(71) Applicant: Dassault Systemes, Velizy Villacoublay (FR)

(72) Inventor: Malika Boulkenafed, Courbevoie (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 69 days.

(21) Appl. No.: 14/289,613

(22) Filed: May 28, 2014

(65) Prior Publication Data

US 2014/0358997 A1    Dec. 4, 2014

(30) Foreign Application Priority Data

May 31, 2013    (EP) ..................................... 13305723

(51) Int. Cl.
*H04L 12/18*    (2006.01)
*H04L 29/08*    (2006.01)

(52) U.S. Cl.
CPC ............ *H04L 12/18* (2013.01); *H04L 12/184* (2013.01); *H04L 67/10* (2013.01)

(58) Field of Classification Search
CPC ........ H04L 12/18; H04L 12/184; H04L 67/10
USPC ......................................................... 709/203
See application file for complete search history.

(56) References Cited

U.S. PATENT DOCUMENTS

| | | | |
|---|---|---|---|
| 6,606,660 B1 * | 8/2003 | Bowman-Amuah | H04L 65/602 709/227 |
| 6,701,344 B1 * | 3/2004 | Holt | H04L 12/1827 463/42 |
| 6,778,553 B1 * | 8/2004 | Chou | H04H 20/42 370/465 |
| 6,789,114 B1 * | 9/2004 | Garg | H04L 41/147 709/224 |
| 7,546,309 B1 * | 6/2009 | Michel | G06F 8/30 |
| 7,738,863 B2 * | 6/2010 | Saarikivi | H04N 21/41407 455/424 |

(Continued)

FOREIGN PATENT DOCUMENTS

| | | | | |
|---|---|---|---|---|
| EP | 2 012 461 A1 | 1/2009 | | |
| EP | 2012461 A1 * | 1/2009 | ......... | H04L 12/1836 |
| EP | 2012461 A1 * | 1/2009 | ......... | H04L 12/1836 |
| WO | WO 2006064473 A1 * | 6/2006 | ........... | H04N 21/434 |

OTHER PUBLICATIONS

Zhang, Quian, et al., "Sender-Adaptive and Receiver-Driven Layered Multicast for Scalable Video Over the Internet", IEEE Transactions on Circuits and Systems for Video Technology, 15(4): pp. 482-495 (Apr. 1, 2005).

(Continued)

*Primary Examiner* — Jerry B Dennison (74) *Attorney, Agent, or Firm* — Hamilton, Brook, Smith & Reynolds, P.C.

(57) ABSTRACT

The invention is directed to a communication middleware for managing multicast channels between a server and a client connected through a communication network, wherein the communication middleware manages at least one compulsory multicast channel for delivering compulsory data to the client and the communication middleware manages at least one optional multicast channel for delivering optional data to the client.

20 Claims, 3 Drawing Sheets

(56) References Cited

U.S. PATENT DOCUMENTS

| | | | | |
|---|---|---|---|---|
| 7,764,972 | B2* | 7/2010 | Shostak | H04L 12/1818 455/519 |
| 7,908,462 | B2* | 3/2011 | Sung | H04L 67/38 345/503 |
| 7,970,918 | B2* | 6/2011 | Thompson | H04L 45/24 709/230 |
| 8,387,090 | B2* | 2/2013 | Collet | H04N 7/165 725/116 |
| 9,191,163 | B2* | 11/2015 | Liu | H04L 1/1893 |
| 9,757,651 | B2* | 9/2017 | Song | A63F 13/42 |
| 2003/0018830 | A1* | 1/2003 | Chen | G06Q 10/06 719/328 |
| 2003/0177187 | A1* | 9/2003 | Levine | A63F 13/10 709/205 |
| 2004/0243580 | A1* | 12/2004 | Markki | H04L 12/18 |
| 2004/0243682 | A1* | 12/2004 | Markki | H04L 12/18 709/207 |
| 2005/0185578 | A1* | 8/2005 | Padmanabhan | H04L 12/185 370/229 |
| 2006/0159117 | A1* | 7/2006 | Furlong | H04L 12/18 370/432 |
| 2006/0168107 | A1* | 7/2006 | Balan | G06F 9/505 709/218 |
| 2006/0268871 | A1* | 11/2006 | Van Zijst | H04L 12/1836 370/390 |
| 2008/0005349 | A1* | 1/2008 | Li | H04L 65/4076 709/231 |
| 2009/0161590 | A1* | 6/2009 | Lewis | H04L 12/1836 370/312 |
| 2009/0292761 | A1* | 11/2009 | Lemmers | H04N 21/434 709/203 |
| 2011/0045910 | A1* | 2/2011 | McKenna | G07F 17/32 463/42 |
| 2011/0078532 | A1* | 3/2011 | Vonog | G06F 3/1454 714/752 |
| 2011/0116376 | A1* | 5/2011 | Pacella | G06F 11/1076 370/235 |
| 2011/0185368 | A1* | 7/2011 | Cole | G06F 9/542 719/315 |
| 2012/0166969 | A1* | 6/2012 | Gillo | A63F 13/31 715/753 |
| 2014/0358997 | A1* | 12/2014 | Boulkenafed | H04L 12/18 709/203 |
| 2015/0222697 | A1* | 8/2015 | Bassiouny | H04L 67/1002 709/203 |

OTHER PUBLICATIONS

Xiao, X., et al. "Toward Systematical Data Scheduling for Layered Streaming in Peer-to-Peer Networks: Can We Go Farther?", IEEE Transactions on Parallel and Distributed Systems, vol. 21, No. 5, May 2010.

ETSI TS 102 034 V1.4.1 (3009-08) Technical Specification; Digital Video Broadcasting (DVC) Transpot of MGEP-2 TS Based on DVB Services over IP Based Network: Aug. 1, 2009.

European Search Report and Written Opinion for EP 13 30 5723 dated Oct. 18, 2013.

* cited by examiner

COMMUNICATION MIDDLEWARE FOR MANAGING MULTICAST CHANNELS

RELATED APPLICATION(S)

This application claims priority under 35 U.S.C. § 119 or 365 to European Application No. 13305723.2, filed May 31, 2013. The entire teachings of the above application(s) are incorporated herein by reference.

FIELD OF THE INVENTION

The invention relates to the field of computer programs and systems, and more specifically to a communication middleware, to a communication system using said middleware, to a method managing multicast channels between a server and at least one client, and to a computer program.

BACKGROUND OF THE INVENTION

Massively Multi-user On line applications (MMOs) allow a large number of users to simultaneously use an application such as real-world phenomena simulator, immersive applications, and so on. Similarly, Massively Multi-user On line Games (MMOG) allow a large number of players to play simultaneous a video game. MMOs and MMOGs notably rely on computer networks, e.g. the Internet, for allowing the users or gamers to connect to the applications or video games.

MMOs and MMOGs involve a complex and large virtual environments which are desired to be rendered in as much detail as possible, in as close to real time as possible, in order to provide users or game players with a more realistic experience. MMOs are specifically designed for the representation and the manipulation of 3D scenes, and are typically utilized on the end-user's computer for applications that require interactive, sequential, real-time 3D scene generation. As the user interacts with the 3D scene, the computer redraws the 3D representation rapidly enough to convey to the user the sense of a continuous, ongoing reality in which the user is participating. The scene is composed of many separate objects that can be manipulated by user when interacting with the 3D scene. Thus, MMOs involve large data volumes, high data rates and high data complexity is generally required in order to manage large numbers of users participating in real time in a spatially complex and highly detailed virtual environment.

MMOs are typically used for simulating real-world phenomena within computer models; for instance Multi-Body Rigid Dynamics, Human Simulation, Cloth Simulation, Particle Simulation. Simulations require accurate data and algorithms that describe real-world phenomena, such as the physical properties (strength, elasticity, etc.) of the materials used in a manufacturing process and the product to create a simulation of the process and a simulation of a product in use. 3D CAD/CAM (Computer Aided Design, Computer Aided Manufacturing) tools allow to create 3D representations of the product or component parts.

The main and critical requirement of MMOs (and MMOGs) is to offer a real-time response at any time to the connected users (and players), regardless of their number, and regardless of the induced computation costs for solving and rendering of the application. Otherwise, the quality of play experience turns poor, decreasing users' (and players') interest for the application, limiting interaction when performing collaborative and distributed design review.

MMO's, just like MMOG's, must be scalable to dynamically adapt to the perpetually changing work-load, maintaining thus real-time performance. Scalability notably comprises the number of users that can simultaneously use the application, the number of computing resources for computing the simulations, the number of simultaneous interactions between objects of the 3D scene allowed by the application, and so on. For MMOG's, the number of players may vary significantly, as well as the positional and graphical attributes of all contained dynamic objects. Nevertheless, the surrounding scenery is set once for all and the typology of dynamic objects and the supported behavior classes are predefined, before the game starts. Said otherwise, 3D scenes in MMOGs comprise a number of predetermined characteristics that strongly limit the needs of computing resources; thus improving scalability.

Regarding advanced MMOs, the scenery and population typology of the 3D scene can evolve and enrich, especially while application is running Indeed, MMOs aim at real-world phenomena, wherein the behaviour of objects is dynamic and excludes predefined behavior classes. Consequently, 3D scenery in MMOs cannot use predefined characteristics as for MMOGs.

The issue of scalability is addressed by MMO and MMOG. Such solutions and techniques include Sharding and Zoning. Sharding consists in cloning the virtual world (partially or entirely) and host newly logged users to cope with the workload rise, but with no possible interaction between shards. So by nature, Sharding cannot support unlimited expansion of the virtual world space and population: shards have indeed a physical capacity ceiling dictated by the performance of their assigned processing resources.

Zoning relies on a partition of the virtual world space in so called zones, each of them under the responsibility of a computing resource. Objects/users can navigate from zone to zone. Associated computing resources communicate then dedicated messages on a network to integrate these moving objects in their computational models.

By its nature, Zoning can manage potentially unbounded augmentation of the virtual world as required in advanced MMO's. Hence, effective real-time simulation of the MMO can be achieve with an optimal load balancing of all the constituting Zones on the available processing resources.

Providing a communication middleware capable of supporting such MMOs and MMOGs applications is a real challenge from network communication perspective. Indeed, middleware applications make easier the development of multiplatform MMOs and MMOGs applications and the development of network communications between these applications. Having in mind scalabity concern, it is important to offer a communication middleware that supports various scalability strategies and optimizes network communications.

Existing communication middlewares offer several communication types (reliable, unreliable, multicast . . . ). However, none of the known communication middlewares is adapted for MMOs' and MMOGs' contexts. In particular, they do not offer communication type that allows providing a scalable and effective real-time simulation, e.g. of a 3D scene in real-world simulation applications.

Within this context, there is a need for a generic and flexible communication middleware dealing with MMO/MMOG scalability and offering support for unlimited expansion of the MMO/MMOG virtual world and population.

SUMMARY OF THE INVENTION

According to one aspect, the invention therefore provides a communication middleware for managing multicast channels between a server and a client connected through a communication network, wherein the communication middleware manages at least one compulsory multicast channel for delivering compulsory data to the client, and the communication middleware manages at least one optional multicast channel for delivering optional data to the client.

The communication middleware may further comprise one or more of the following:

a Listener module for detecting a predefined event sent by a software application on the communication network and received by the server or the client, and an Event Manager module specifying the behavior of a software application in accordance with the predefined event detected by the Listener module;

a Communication module for handling connections between the client and the server, wherein the Communication module transmits to the Listener module incoming data received from the communication network;

an Application Abstraction module that provides callback functions for execution of commands by a software application using the communication middleware;

on the server side; an Object Manager module for:
(i) managing the client having requested a connection to the server; and
(ii) managing the at least one compulsory or optional multicast channels of the registered client; and wherein the Communication module receives from the Object Manager module outcoming data to be transmitted on the communication network.

The invention further proposes a communication system comprising a server and at least one client that are connected through a communication network, wherein:
the server runs the above communication middleware; and
the at least one client runs the communication middleware.

The communication system may further comprise one or more of the following:

the server further runs a first software application providing access to data that can be requested by the at least one client through the communication middleware run by the server;

the client further runs a second software application providing access to data that can be requested by the server through the communication middleware run by the at least one client;

the first and second software applications are a massively multiuser online application;

the first software application is Product Lifecycle Management application and the second software applications is a Computer-Aided Design application.

The invention further proposes a method for managing multicast channels between a server and at least one client connected through a communication network, the server running the above communication middleware and the at least one client running the above communication middleware, the method comprising:

managing, at the server side, compulsory multicast channels and optional multicast channels;

subscribing, at the at least one client side, to the compulsory multicast channel(s) sent by the server to the at least one client; and deciding, at the at least one client side, whether or not to subscribe to at least one optional multicast channels sent by the server to the at least one client.

The method may further comprise:

the server and the at least one client run a massively multiuser online application that simulates a virtual world divided into zones, the massively multiuser online applications of both the server and the client using the communication middleware to communicate, the method further comprising:

determining, at the server side, the one or more zones of the virtual world that are to be simulated by the at least one client;

sending, to at least one client, the multicast address(es) of the compulsory multicast channel(s) dedicated to the transmission of compulsory data allowing simulation of the one or more zones to be simulated by the at least one client;

sending, to at least one client, the multicast address(es) of the optional multicast channel(s); and wherein the subscription to at least one compulsory or optional multicast channel(s) sent by the server to the at least one client is performed by using the multicast address(es).

The invention further proposes a computer program comprising instructions for execution by a computer, the instructions comprising means for implementing the above communication middleware.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where.

DETAILED DESCRIPTION OF THE INVENTION

A description of example embodiments of the invention follows.

The teachings of all patents, published applications and references cited herein are incorporated by reference in their entirety.

Figure 2:
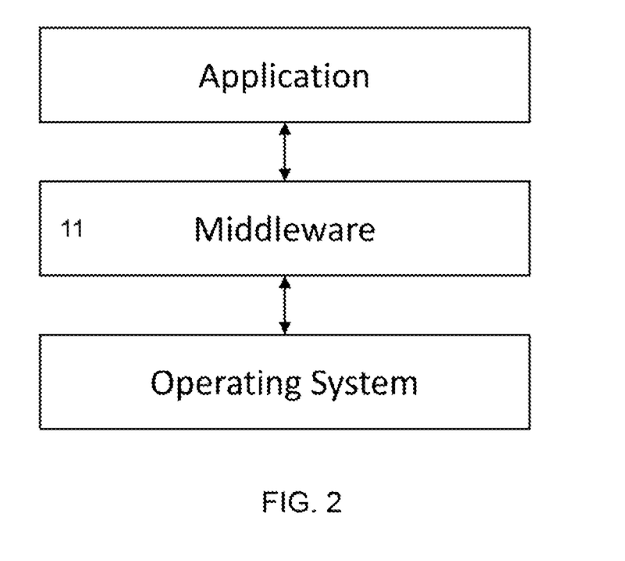
FIG. 2 shows a communication middleware lying between the operating system and an application executed on the system.

With reference to the scheme of FIG. 2, it is proposed a communication middleware (11) for managing multicast channels between a server and a client connected through a communication network. The term middleware means a software module executed by a computer system, the middleware lying between the operating system (also referred to as OS) and at least one software application executed by the computer system. The software application may be, e.g. a massively multiuser online application (MMO), massively multiplayer online game (MMOG). The expression communication middleware means a middleware that provides functions for data exchange between computer systems on which the communication middleware runs. The functions are at least those provided by layer 5 and 6 described in the Open Systems Interconnection (OSI) model (ISO/IEC 7498-1). The terms server and client refers to the client-server model wherein a server is a computer system that shares its resources and a client is a computer system that contacts the server for using its resources. The expression communication network refers to a collection of devices (e.g. routers, switch, cable . . . ) which enables data exchanges between at least two terminals, e.g. a client and a server.

The communication middleware manages at least one compulsory multicast channel for delivering compulsory data to the client. The term multicast means the delivery of data to a group of destination computers in a single transmission from the source. A multicast channel refers to a physical or logical medium for delivering simultaneously data to a group of destination computers in a single transmission from the source. For instance, a multicast channel may refers to the combination of a content source IP address and the IP Multicast group address to which the content is being broadcasted. In practice, the data to be delivered is simultaneously sent to the destination computers of the group. Compulsory multicast channel transports compulsory data, that is, core data for the correct functioning of an application. For instance, in a MMO simulating 3D modeled objects in a 3D space, compulsory data may be, but is not limited to, 3D object's positions updates, zones for specific communications.

The communication middleware further manages at least one optional multicast channel for delivering optional data to the client. Optional multicast channel transports optional data, that is, data that are not mandatory for the correct functioning of an application. For instance, in a MMO simulating 3D modeled objects in a 3D space, optional data may be used, but is not limited to, for temporary or localized communication, for e.g., chat channel, specific simulation update channel, and so on.

Such a method improves effective real-time simulation and scalability of an application hosted by a server and used by several clients, in particular for Massively multi-users/players (MMO, MMOG) applications and the like. Indeed, the communication middleware of the invention supports various scalability strategies, optimizes network communications, and contributes to decrease the consumption of bandwidth on the network.

Various scalability strategies can be implemented thanks to the distinctions between compulsory or optional communications. For instance, an MMO application, where scalability is properly implemented and in which it is decided to use the geographic decomposition without necessarily setting a zone to a physical server, these channels can be used for simulating the different geographic decompositions. By this way, when a client connects to the server, based on its geographic position, he can be automatically subscribed to one of these channels; therefore, offering support for unlimited expansion of the MMO space and population.

The distinction between compulsory and optional multicast channels can facilitate MMO applications users' privilege management. For instance, some multicast channels can be visible only for particular users and so on. Again, the use of the communication network is optimized.

It can also be used for zones management and thus improve system's scalability. For instance, one compulsory multicast channel may be allocated per zone.

Throughout this specification the word "application" and "video games" will be understood as to be synonymous, and the terms MMO and MMOG will be indifferently used.

Figure 1:
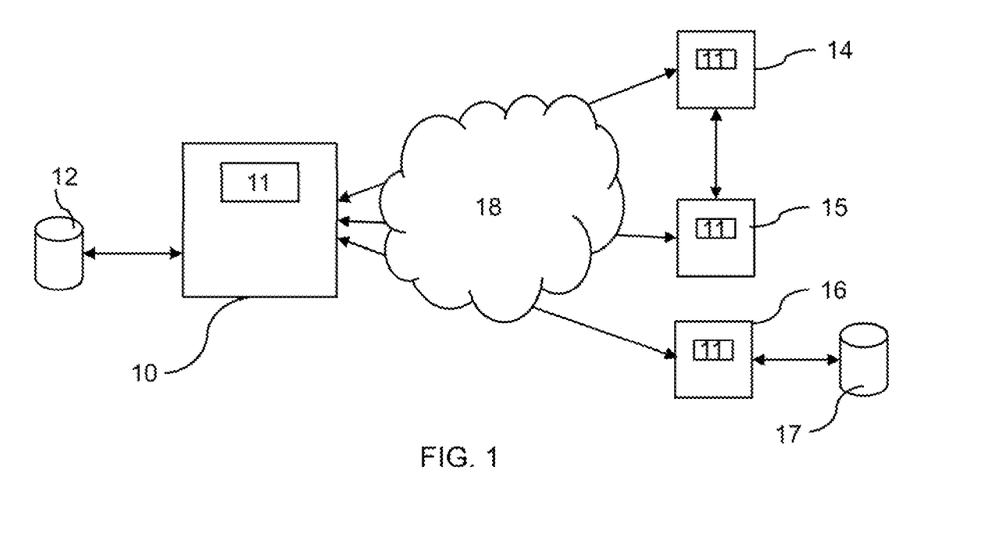
FIG. 1 shows an example of communication system according to the invention server and a client connected through a communication network.

Referring now to FIG. 1, it is shown an example of a communication system in which the invention may be implemented. The communication system comprises a server 10 executing a communication middleware 11 and runs a first software application that provides access to data that can be requested by a client through the communication middleware of the server. In practice, the requested data may be stored on data storage 12.

The communication system further comprises at least one client 14, 15, 16 that executes a communication middleware 11' and runs a second software application. The second software application may provide access to data that can be requested by the server through the communication middleware 11' run by the client. Furthermore, the data stored on client may be requested by other client of the communication system, e.g. the client 14 may access data 17 of client 16. In addition, the second software application may also request data to the server. In practice, the client may comprise a memory 17 (for instance organized as a database) for storing the requested or request able data.

The server and the clients are linked through a communication network 18 that can be part of a remote access network, global network (e.g. the Internet), a worldwide collection of computers, Local Area or Wide Area Networks, and gateways that currently use respective protocols (TCP/IP, Bluetooth, etc.) to communication with one another. Other electronic device/computer network architectures are suitable. This amounts to say that the server and the clients are connected.

In the example of FIG. 1, the server 10 and the clients 14, 15, 16 communicate according to the client/server paradigm, which means that the server 10 shares its resources (the data 12) and the clients can contact the server for using its resources. It is to be understood that communications between clients can be performed without the server is involved (e.g. peer to peer communications).

The first and second applications may be, but not limited to, a massively multiuser online application. An example of a communication system according to the invention wherein the first and second applications are an MMOG will be discussed in reference with FIG. 4.

Figure 6:
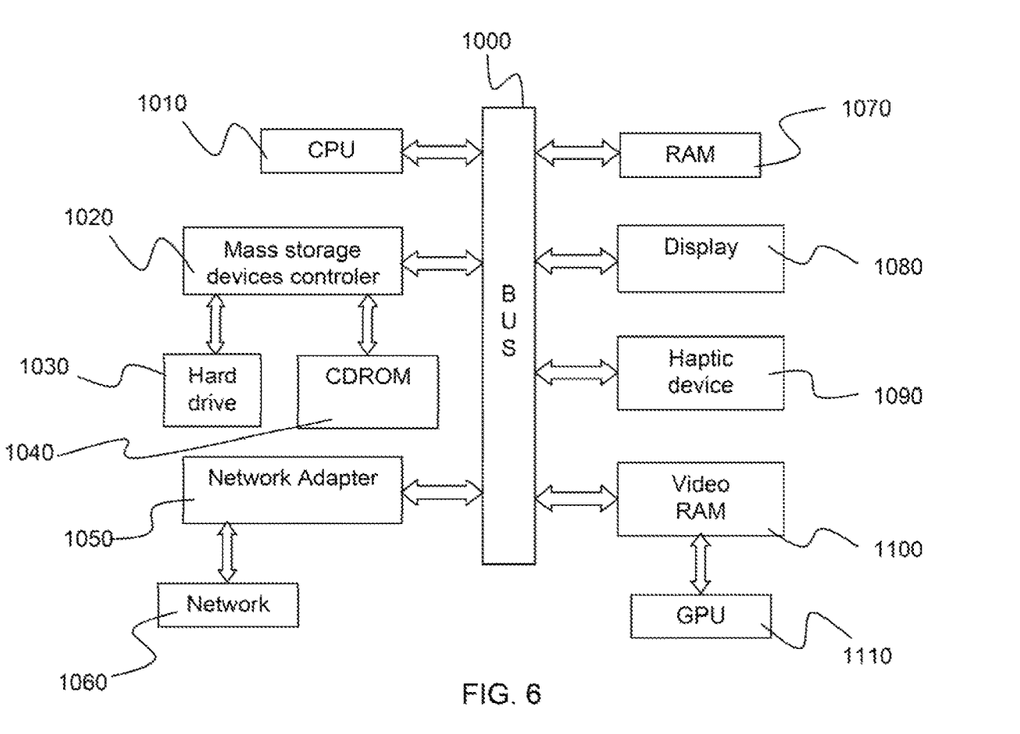
FIG. 6 shows an example of a computerized system executing the communication middleware according to the invention.

FIG. 6 is an internal diagram that shows an example of the internal structure of computer (e.g. client computers 14, 15, 16 or a server computer 10).

Each computer 10, 14, 15, 16 comprises a central processing unit (CPU) 1010 connected to an internal communication BUS 1000, a random access memory (RAM) 1070 also connected to the BUS. Each computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. Each computer may also include a haptic device 1090 such as cursor control device, a keyboard or the like. A cursor control device is used in each computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals.

Figure 3:
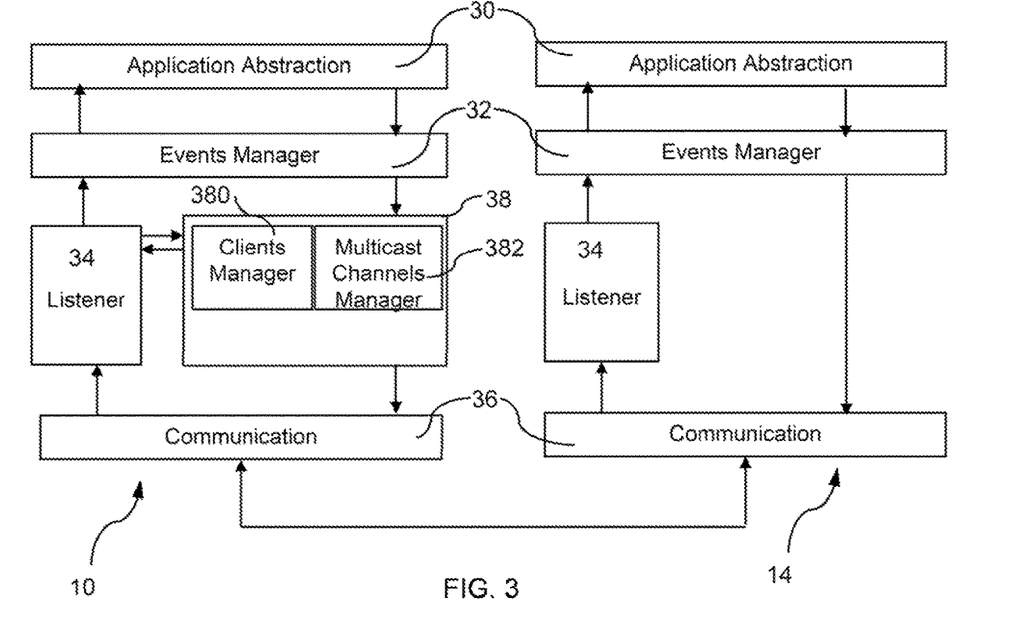
FIG. 3 shows an example of components of the communication middleware according to the invention at the server side and at the client side.

Referring now to FIG. 3, it is shown an example of communication middlewares in a communication system wherein one communication middleware is executed (or run) by a server 10 and one communication middleware is executed (or run) by a client 14. The communication middleware executed by the server differs from the one executed by the client in that the communication middleware executed by the server further comprises an Object Manager module 38. Hence, the communication middlewares of the server and the client depicted on FIG. 3 have in common a Communication module 36, a Listener module 34, an Event Manager module 32, and an Application Abstraction module 30. These modules 30, 32, 34, 36, 38 are now discussed.

The Communication module 36, also referred to as low level communication layer handles communication between the client and the server and provides fundamental communication utilities, such as waiting for clients' connections, creation of a reliable communication session, waiting for unreliable data reception, sending data in a reliable or unreliable mode, specifying communication mode (point-to-point or multicast). The communication module advantageously insulates the application developer from the details of the communicating components of a client/server architecture.

The Listener module 34 detects an event sent by a software application (e.g. the software application executed on the client) that is intended to be received by another software application (e.g. the software application executed on the server). The Listener module is typically on top of the Communication module 36 and it receives incoming data transmitted by the Communication module 36. The Listener module allows to handle new connections requests received by the Communication module 36 and acknowledge them, as well as, to receive incoming messages, process them and transfer them to the appropriate component based on their type to the software application that uses the communication middleware.

The communication middleware of the server may further comprise an Object Manager module 38 that allows the server to manage clients 14, 15, 16 and multicast channels. Two types of objects are thus specified and managed by the Object Manager module: client objects and channel objects. To this aim, two modules may be comprised in the Object Manager module: a client manager 380 managing client objects and a channel manager 382 managing channel objects. The term object means a set of properties characterizing the client or the channel. An object may comprise the following properties:

an identity of the object for distinguishing it from other objects (e.g. for identifying each client connected to the server, for identifying each compulsory and optional channels);

a state of the object that encompasses all of the usually static characteristics of the object plus the current usually dynamic values of each of these characteristics. For instance, the object of a client may have a characteristics providing connection state of the object with the server (connected, or not connected to the server);

a behavior of the object describes the method(s) that can be accessed through the object's interface and by which the object can be used.

The Object Manager module 38 is essentially called by the Listener module 34 when, for instance, a client requests a connection to the server: in response to the connection request, the Object Manager module registers the client and acknowledges registration to the client.

When the client requests a connection to the server for the first time, a new client object is created for this client; for instance, an identity, a state and a behavior are created for the new client object. Interestingly, the client manager 380 may permanently store client objects: for each client connection request, the Object Manager module checks whether an object associated to this client exists, and if yes, the client object is used and, if necessary, properties the object are modified. For instance, the state of former object stored on the client manager may be modified from "not connected" to "connected". The client requesting connection to the server may be identified thanks to, but not limited to, its network address (e.g. the IP address). Interestingly, uniqueness of each client object may be assured by its identity property.

Still upon client connection request, the Object Manager module manages compulsory and optional multicast channels. This is typically performed by the multicast channel manager 382. Each compulsory and optional multicast channel is represented by a multicast object. The management of channels relies as well on the Communication module in order to send messages to one client or a multicast channel. As shown on FIG. 3, the Object Manager module 38 transmits to the Communication module 36 the outcoming data to be transmitted. Regarding compulsory multicast channels, clients are subscribed to them at this level. However, optional multicast channels are notified to the client software application which defines the appropriate behavior.

The Object Manager module 38 essentially manages client(s) having requested a connection to the server and manages compulsory and/or optional multicast channels allocated to the client(s). The term managing involves at least the actions of creating, maintaining, modifying, and deleting a client or channel object.

The communication middleware of the client and the server may further comprise an Events Manager 32 that manages a set of events that are transmitted to the software application laying over the communication middleware. The events to trigger may be detected by the Listener module 34 based on the operation code sent within the message received by the Listener module, and then transferred to the Event Manager module. In practice, the developer of the software application laying over the communication middleware specifies application's behavior triggered by predefined events. Hence, the Event Manager module specifies the behavior of a software application in accordance with a predefined event detected by the Listener module.

Practically, the Events Manager may trigger at least one of the following events:

i. "Login succeeded": the event triggered when the server accepted the login request;

ii. "Disconnection": the event triggered in case the server suddenly goes down. It is the only event that has a default behavior—it calls the function for logging out and exits;

iii. "New channels available": the event triggered when there are new channels available to which a client might want to subscribe. The function associated with this event will receive as parameter the name of the channel;

iv. "Receive message from the server": the function associated with this event will receive the message as parameter;

v. "Receive message from a channel": the function associated with this event will receive the message and the channel on which this message has been sent as parameters.

As discussed previously, the communication middleware of a client may not comprise an Object Manager module. In fact, even if the communication software of the client would implement an Object Manager module, outcoming data to be transmitted from a client to a server is passed to the Communication module by the Events Manager.

When the software application wants to do a particular action, such as logging in to the server, joining a channel, sending a message, logging out, this particular action may be translated in the middleware in an operation code. The operation codes are currently defined on a single byte for optimized network bandwidth consumption and they are shared between the client module and the server one. When a client wants to do a specific action, it will add the operation code so that the server would be able to distinguish the action and act accordingly.

The communication middleware may provide the following operation codes. Each of them leads to a specific action on the server and/or client side. From the client to the server:

LOGIN REQUEST: this operation code allows a client to request the log in to the server;

RECONNECT REQUEST: this operation code allows a client to request a reconnection, e.g. after an unintentional disconnection;

LOGOUT REQUEST: when a client wants to announce the server that it has the intention of disconnecting itself;

CHANNEL MESSAGE: when a client wants to send a message to a group of clients, it has to request the server to retransmit its message on an optional multicast channel;

SESSION MESSAGE: allows sending a point-to-point (direct) message from the client to the server.

From the server to the client:

LOGIN SUCCESS: is a login acknowledgement sent back to the client when the server accepts its login request;

LOGIN FAILURE: sent if client's login request failed;

UDP INFO: sent following a LOGIN SUCCESS. It contains required information for a client to send UDP messages;

JOINED CHANNEL: sent following a LOGIN SUCCESS. It contains the list of compulsory multicast channels to which the client is subscribed by default;

OPTIONAL CHANNEL: sent following a LOGIN SUCCESS. It contains the list of available optional multicast channels which the client may join;

CHANNEL MESSAGE: sent to the group of client who joined the multicast channel;

DISCARD CHANNEL: allows to force client's unsubscribe from a multicast channel;

SESSION MESSAGE: allows sending a reliable (TCP) or unreliable (UDP) point-to-point (direct) message to the destination client;

RECONNECT SUCCESS: is a reconnect acknowledgement sent to the client when the server accepts its reconnect request;

RECONNECT FAILURE: sent if client's reconnect request failed.

The Communication middleware may further comprise an Application Abstraction module 30 on which all received messages appear as events. The events are typically detected by Listener module 34, which transfers the detected event to the Application Abstraction module. When an event appears on the Application Abstraction module, the software application knows what to do with this information, this knowledge being decided by the developer of the software application. In practice, the set of events may be associated with callbacks functions implemented in the Application Abstraction module that are invoked by the software application for execution of commands by the software application. The term callback refers to a piece of executable code that is passed as an argument to another code, as known in the art. There is no need for the application developer to create a thread for receiving messages as this problem has been already handled by the Application Abstraction module. Said otherwise, the developer needs only to define what application requirements are and to complete the functions associated with the events. The Application Abstraction module 30 is thus a layer that contains the application logic, therefore providing a high level Application Programmable Interface (API), which facilitates the development of client/server applications.

Optionally, the Application Abstraction module may encapsulate a real time physics engine if required (eg. for MMO or MMOG software application). The term physical engine means computer software for simulating physical phenomena; for instance, the physical engine can provides an approximate simulation of certain physical systems, or real-time 3D rendering capabilities, as known in the art. The real time physical engine may thus provide core functionalities for the software application, so that the development of the game application is made easier and costs less.

Hence, the communication middleware is totally generic and may be used to create a wide variety of applications (chat applications, MMO like applications, networked physics applications for example). In particular, the Communication Middleware provides functions to send messages through different communication protocols, and callbacks, which are redefined in the application layer to catch incoming messages and triggered events.

Figure 4:
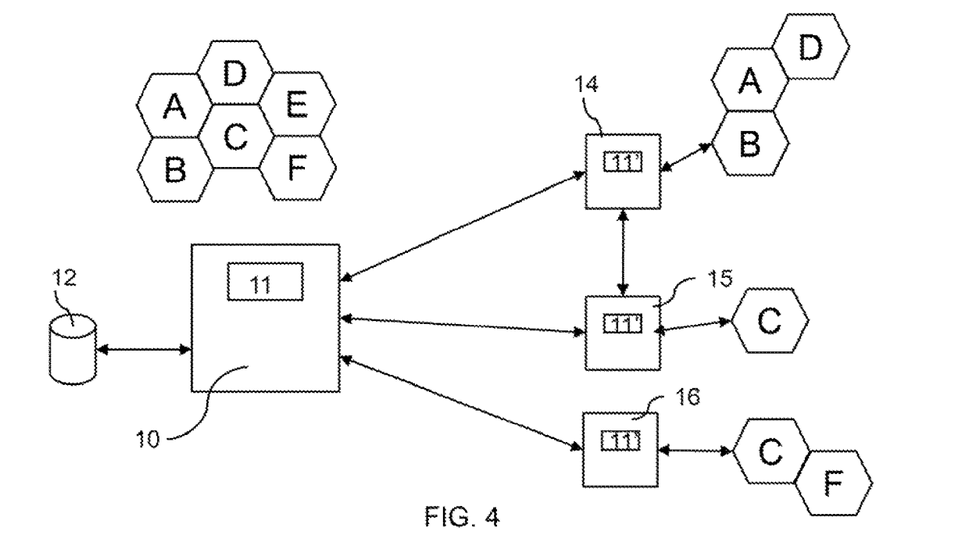
FIG. 4 shows an example of massively multiuser online applications running at the server and client side and communicating via the communication middleware according to the invention.
Figure 5:
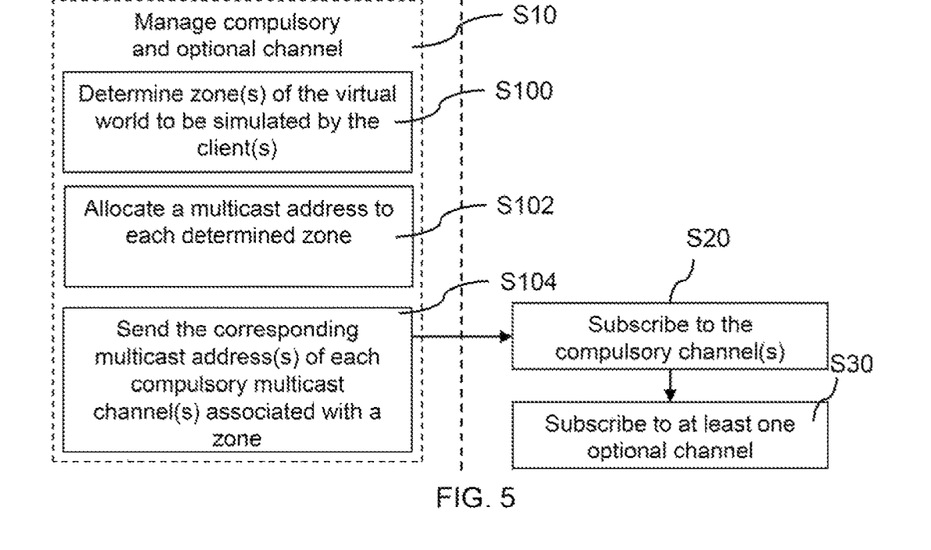
FIG. 5 shows an example of method for managing multicast channels between a server and at least one client wherein the server and the client communicate via the communication middleware according to the invention.

Referring now to FIG. 5, it is shown an example of a method for managing multicast channels between a server and at least one client according to the invention. The server and the client are connected through a communication network and run a communication middleware according to the invention, forming a communication system, as shown in FIG. 4. The server 10 and the client 14, 15, 16 run software applications that are MMOG. Especially, the server manages a virtual world wherein the users of clients 14, 15, 16 evolve, the virtual world being decomposed into zones A, B, C, D, E, F.

At step S10, the server manages a set of compulsory multicast channels and optional multicast channels. This means that the server uses procedures that pertain to the administration and maintenance of the compulsory and optional multicast channel. Practically, the server can perform on the channel at least the actions of creating, maintaining, modifying, and deleting a channel. These operations may be performed on channel objects. The management of the compulsory and optional multicast channel may be decomposed in sub-steps S100, S102, S104.

At step S100, the server determines one or several zones of the virtual world that are likely to be executed by the clients. In practice, the server determines all the zones of the virtual world. Alternatively, the determination of the zones may be performed several times, e.g. at regular intervals or continuously; this advantageously allows to ensure that new zones that might appear in the virtual world are known by the server.

For instance, the server 10 has determined that the virtual world is decomposed into zones A, B, C, D, E, F that might be played by one or more clients.

Next, at step S102, a multicast address is then allocated to each determined zone so that each zone is attached to a compulsory multicast channel, each compulsory multicast channel having a single multicast address. It is to be understood that the server has enough multicast addresses so that each zone can be attached to a compulsory multicast channel. In the event the number of zones is larger than the number of multicast addresses, the server can either request more multicast addresses or reduce the number of zones, e.g. by merging two or more zones.

The server further manages one or more optional multicast channels. These optional multicast channels are used for temporary or localized communications, such as chat channel, specific simulation update channel, etc. In practice, the creation of optional channels is decided by the server in accordance with optional data that the software application may transmit to the clients. For instance, in reference to the communication system of FIG. 4, the server that manages zones A, B, C, D, E, F may create an optional multicast channel for transmitting information relative to a chat communication to the clients 15, 16 that simulate the zone C of the virtual world.

Then, at step S104, the server sends to the client a list of compulsory multicast channel(s). The transmission is performed once the client is connected to the server. Once client's application logs in successfully to server's application, the client transmits to the server the part of the virtual world that the client wishes to play. Then, the server deduced from the client wishes which zones of the virtual world are involved, and then the server transmits to the client a list of compulsory multicast channels wherein the list is determined according to the zones to be executed by the client (that is, according to the zones deduced by the server in accordance with the client wishes). By this way, less information is transmitted to the client.

Alternatively, the server side middleware can send back the list of all existing compulsory multicast channels. The list may typically comprise the multicast address(es) of the compulsory multicast channel(s). In this case, the client is aware of all the zones and it registers to the compulsory multicast channel(s) of the zone(s) of the virtual world it wishes to simulate or play. Interestingly, the client has knowledge of all the zones of the virtual world and can therefore register to the compulsory multicasts channel of the zones he wishes to play without the need to inform the server about that. For instance, if the client wishes at a later stage to simulate supplementary zones, he does not need to request new compulsory multicast channel to the server.

In the event new zones are introduced in the virtual word, the server can inform the client by sending a new list of compulsory multicast channels. This list may be an update list that contains only the new compulsory multicast channels, or it may be a list that comprises all compulsory multicast channels.

Next, at step S20, the client subscribe to the compulsory multicast channel(s) of the list sent by the server. The subscription is mandatory only for the zones that the client wants to simulate. For instance, referring now to FIG. 4, the server 10 can sent the client 14 a list comprising the multicast address of the zones A, B, C, D, E, F, and the client subscribes to the compulsory multicast channels related to the zones A, B and D. Alternatively, the server has been informed by the client that he wishes to simulate the zones A, B and D, and the list sent by the server only comprises the multicast addresses for the zones A, B and D.

The term subscription means that the client registers to the multicast channel(s). This is performed as known in the art. The compulsory multicast channels are defined once at the server side. They are transparently and compulsorily joined by the supported application at the middleware level. A client cannot unsubscribe from a compulsory multicast channel. It is the server that can demand to a client to discard such a channel.

Next at step S30, the server sends to the client a list of one or more optional multicast channel(s), and the client decides whether or not to subscribe to at least one optional channels sent by the server to the client. It is to be understood that the step S30 is optional, e.g. in the event there is no optional data to transmits to the client. The software application run by the client is informed of existing optional multicast channels which it can freely join or leave. Furthermore, the software application (or the user) can ask to create an optional multicast channel. Such optional multicast channels are used for temporary or localized communication, for e.g., chat channel, specific simulation update channel, etc. In addition, the supported application can limit the optional multicast channel to a group of selected users.

In this example of FIG. 5, the subscription to compulsory and optional multicast channels is carried out in two successive steps S20 and S30. It is to be understood that these two steps may be carried out concomitantly. Similarly, the sending to the client of the lists of compulsory and optional multicast channel may be concomitantly performed.

The example of the method according to the invention depicted on FIG. 5 is computer-implemented. This means that the steps (or substantially all the steps) of the method are executed by at least one computer or a computerized system. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the user can ask to create an optional multicast channel. The user may trigger the creation an optional multicast channel via a haptic device such as a keyboard, a mouse, a stylus, or the like. For instance, in a two-button mouse, the left button could be used for selecting the scene in a list of scenes. The system may also identify by default a scene, i.e. without requiring user selection.

A typical example of computer-implementation of the method is to perform the method with a computer (e.g. client computers 14, 15, 16 or a server computer 10) comprising a memory and a processor. The memory, which stores a database, is merely any hardware suitable for such storage. The processor may also be referred to as a computing unit.

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the present invention, as shown in the example of FIG. 1, the server 10 shares its resources that are stored, e.g. on a memory which store a database 12. The clients 14, 15, 16 may also store they resources on a memory 17, e.g. data relative to the zones of the virtual world simulated by the clients. The database may comprise a three-dimensional virtual world comprising one or more objects. The one or more objects are stored on the database, and may be stored independently from the scene. The database may further comprise a computer program comprising instructions for execution by the system. The instructions are adapted for performing the steps of the present method.

An object is any object defined by data stored in the database. By extension, the expression "object" designates the data itself. According to the type of the software application, the objects may be defined by different kinds of data.

For instance, the software application run by the client or the server may be a Computer-Aided Design (CAD) software application. In the context of such application, an object may be a modeled object; typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

By CAD system, it is meant any system suitable at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is meant any system suitable for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

By CAE system, it is meant any system suitable for the analysis of the physical behaviour of a modeled object. In a CAE system, a modeled object is thus defined by data suitable for the analysis of such behavior. This may be typically a set of behavioring features. For instance, a modeled object corresponding to a door may be defined by data indicating that the door rotates around an axis.

A computer program may comprise instructions by a computer, the instructions comprising means for implementing the method of the invention. The addition can also comprise means for implementing the communication middleware of the invention. The invention may for example be implemented in digital electronic circuitry, or in computer hardware, firmware, software, or in combinations of them.

Communication middleware of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

It is now discussed an example of how to instantiate a server and a client for a given software application.

A server application may be implemented using the following steps.

In a first step, a new Application Abstraction is created, derived from the Events Manager to provide a set of events, e.g. the event previously discussed. These events are used for creating a specific server, manage channels and clients, and send messages. The following events are to be handled:

Server initialization: this event defines the action to do at the server start;

A client login: this event defines the action to do after a client has been connected to the server;

A client logout: this event defines the action to do after a client logs out;

A reception of a session message that may be reliable or not: this event defines the action to do when a session message is received;

A reception of a channel message: this event defines the action to do when a message to send on a channel is received In a second step, it is defined the server software application behavior upon events (server initialisation, client log-in/out, message reception), whose specifications are provided in the Events Manager. These are typical behaviors to be implemented by the application developer:

1—The server is initialized by:

Setting a TCP port to listen to new client connections. This port is the only port clients must know;

Adding a particular UDP port for communication from clients to server;

Set the number of UDP ports the server wants to listen to;

Create a channel to listen to and to send messages on, giving a unique name, a delivery method, a status (optional or compulsory). A multicast address and port may also be created. By creating a channel during the initialisation phase, all new connected clients will be notified about the existence of the channel.

2—The client login behavior is defined as follow:

Add a client object in the Clients Manager;

When the login event callback is called at the Application Abstraction, a TCP connection between the client and the server has been created. The server can choose to let the Communication module send a login success response or a login failed to the client.

3—The client logout behavior is defined as follow:

Remove the client object created at v. from the Clients Manager;

When the logout event callback is called at the Application Abstraction, it means that either the client requested for a disconnection, or that the connection with the client has been lost (maybe the client closed involuntary);

4—The server behaves as follow when a message is received

When a session message is received, it means that the client sends direct to the server either on its TCP session or on UDP port;

When a channel message is received, it means that this message is intended to be sent on the given channel.

A client application may be implemented using the following steps.

In a first step, a new Application Abstraction is created, derived from the Events Manager to provide a set of events, e.g. the event previously discussed. These events are used for creating a specific client application. The following events are to be handled by the client Application Abstraction:

a) The login event login( ) comprises:
  i. Connecting to the server;
  ii. Creating a listening thread for incoming messages;
b) The logout event logout( ) comprises:
  i. Disconnecting from the server (if logout is initiated by the client, a LOGOUT_REQUEST message will be sent previous to the disconnection);
  ii. The listening thread is killed and all information stored is destroyed.
c) The event for joining a multicast channel joinChannel (name) comprises:
  i. Joining a multicast address associated with the specified name;
  ii. Once subscribed to the channel, the client will receive all messages sent on this channel.
d) The event for leaving a multicast channel leaveChannel (name) comprises:
  i. Leaving a multicast address associated with the specified name;
  ii. Once unsubscribed from the channel, the messages sent on this channel will not reach the client.
e) The event for sending a message send (message, UDP/TCP, to server/to a specified channel) comprises:
  i. Sending a message through UDP or TCP having as addressee the server or a specified channel.

In a second step, it is defined the client software application behavior upon events loggedInEvent( ) channelAvailableEvent( ) channelRecvMsgEvent( ) recvMsgEvent( ) disconnectedEvent( ) whose specifications are provided in the Events Manager.

The preferred embodiment of the present invention has been described. It will be understood that various modifications may be made without departing from the spirit and scope of the invention. Therefore, other implementations are within the scope of the following claims. For instance, the software application run by the server may be PLM database and the software application run by the clients may be CAD/CAE software application, and the clients subscribe to one of the compulsory multicast channels according to their geographic position.

While this invention has been particularly shown and described with references to example embodiments thereof, it will be understood by those skilled in the art that various changes in form and details may be made therein without departing from the scope of the invention encompassed by the appended claims.

What is claimed is:

1. A system for managing multicast channels between a server and a client connected through a communication network, the system comprising:
  a processor; and
  a memory with computer code instructions stored therein, the memory operatively coupled to said processor such that the computer code instructions configure the processor to implement:
  a communication middleware, the communication middleware being a software module enabling data exchange between an operating system and an application executed by the system, the communication middleware being configured to manage at least one compulsory multicast channel for delivering compulsory data from the application running on a server side of the communication network to the application running on a client side of the communication network by associating the client to a particular compulsory multicast channel based on information received by the client, and to further manage at least one optional multicast channel for delivering optional data from the application running on the server side to the application running on the client side over the communication network, the optional data being unnecessary for the application on the server side and the application running on the client side to function correctly, and the compulsory data delivered by the at least one compulsory multicast channel being core data employed for correct functioning of both the application running on the server side and application running on the client side.

2. The system of claim 1, further comprising:
a Listener module for detecting a predefined event sent by a software application on the communication network and received by the server or the client; and
an Event Manager module specifying the behavior of a software application in accordance with the predefined event detected by the Listener module.

3. The system of claim 2, further comprising:
a Communication module for handling connections between the client and the server;
wherein the Communication module transmits to the Listener module incoming data received from the communication network.

4. The system of claim 1, further comprising:
an Application Abstraction module that provides callback functions for execution of commands by a software application using the communication middleware.

5. The system of claim 2, further comprising, on the server side:
an Object Manager module for:
(i) managing the client having requested a connection to the server; and
(ii) managing the at least one compulsory or optional multicast channel of the registered client;
and wherein the Communication module receives from the Object Manager module outcoming data to be transmitted on the communication network.

6. A communication system comprising:
a server operatively connected to at least one client a communication network, the server configured to run a communication middleware;
wherein the at least one client is configured to run the communication middleware, and
the communication middleware being a software module enabling data exchange between an operating system and an application executed by the system, the communication middleware managing at least one compulsory multicast channel for delivering compulsory data from the application running on a server side of the communication network to the application running on a client side of the communication network over the communication network by associating the client to a particular compulsory multicast channel based on information received by the client; and
the communication middleware manages at least one optional multicast channel for delivering optional data from the application running on the server side to the application running on the client side over the communication network, the optional data being unnecessary for the application running on the server side and application running on the client side to function correctly, the compulsory data delivered by the at least one compulsory multicast channel being core data employed for correct functioning of both the application running on the server side and application running on the client side.

7. The communication system of claim 6, wherein:
the server further runs the first application providing access to data that can be requested by the at least one client through the communication middleware run by the server;
the client further runs the second application providing access to data that can be requested by the server through the communication middleware run by the at least one client.

8. The communication system of claim 7, wherein the first and second applications are a massively multiuser online application.

9. The communication system of claim 7, wherein the first application is Product Lifecycle Management application and the second applications is a Computer-Aided Design application.

10. The communication system of claim 6, wherein the communication middleware further comprises:
a Listener module (34) for detecting a predefined event sent by the first or second application on the communication network and received by the server or the client; and
an Event Manager module (32) specifying the behavior of the first or second application in accordance with the predefined event detected by the Listener module.

11. The communication system of claim 10, wherein the communication middleware further comprises:
a Communication module (36) for handling connections between the client and the server;
wherein the Communication module transmits to the Listener module incoming data received from the communication network.

12. The communication system of claim 10, wherein the communication middleware further comprises:
an Object Manager module (38) for:
(i) managing (380) the client having requested a connection to the server; and
(ii) managing (382) the at least one compulsory or optional multicast channel of the registered client; and
wherein the Communication module receives from the Object Manager module outcoming data to be transmitted on the communication network.

13. The communication system of claim 6, wherein the communication middleware further comprises: an Application Abstraction module (30) that provides callback functions for execution of commands by the first or second application using the communication middleware.

14. A method comprising:
managing multicast channels between a server and at least one client connected through a communication network, the server running a communication middleware and the at least one client running the communication middleware, the communication middleware being a software module enabling data exchange between an operating system and an application executed by the system, by:

managing, at a server side of the communication network, compulsory multicast channels and optional multicast channels;

subscribing, at at least one client side of the communication network, to the compulsory multicast channel(s) sent by an application running on the server side to—the application running on the at least one client side by associating the client to a particular compulsory multicast channel based on information received by the client; and deciding, at the at least one client side, whether or not to subscribe to at least one optional multicast channel sent by the server to the at least one client, the optional data being unnecessary for the application running on the server side and application running on the client side to function correctly, wherein the compulsory data delivered by the at least one compulsory multicast channel being core data employed for correct functioning of both the application running on the server side and application running on the client side.

15. The method of claim 14, wherein the server and the at least one client run a massively multiuser online application that simulates a virtual world divided into zones, the massively multiuser online applications of both the server and the client using the communication middleware to communicate, the method further comprising:

determining, at the server side, the one or more zones of the virtual world that are to be simulated by the at least one client;

sending, to at least one client, the multicast address(es) of the compulsory multicast channel(s) dedicated to the transmission of compulsory data allowing simulation of the one or more zones to be simulated by the at least one client;

sending, to at least one client, the multicast address(es) of the optional multicast channel(s); and wherein the subscription to at least one compulsory or optional multicast channel(s) sent by the server to the at least one client is performed by using the multicast address(s).

16. The method of claim 14 wherein the communication middleware further comprises:

a Listener module (34) for detecting a predefined event sent by the first or second application on the communication network and received by the server or the client; and an Event Manager module (32) specifying the behavior of the first or second application in accordance with the predefined event detected by the Listener module.

17. The method of claim 16, wherein the communication middleware further comprises:

a Communication module (36) for handling connections between the client and the server;

wherein the Communication module transmits to the Listener module incoming data received from the communication network.

18. The method of claim 16, wherein the communication middleware further comprises:

an Object Manager module (38) for:
(i) managing (380) the client having requested a connection to the server; and
(ii) managing (382) the at least one compulsory or optional multicast channels of the registered client; and wherein the Communication module receives from the Object Manager module outcoming data to be transmitted on the communication network.

19. The method of claim 14, wherein the communication middleware further comprises: an Application Abstraction module (30) that provides callback functions for execution of commands by a software application using the communication middleware.

20. A computer program product comprising:

a non-transitory computer readable medium; and the non-transitory computer readable medium embodying instructions for execution by a computer, the instructions comprising means for implementing communication middleware for managing multicast channels between a server and a client connected through a communication network, the communication middleware being a software module enabling data exchange between an operating system and an application executed by the system, wherein:

the communication middleware manages at least one compulsory multicast channel for delivering compulsory data from an application running on a server side of the communication network to the application running on the client side of the communication network over the communication network by associating the client to a particular compulsory multicast channel based on information received by the client; and the communication middleware manages at least one optional multicast channel for delivering optional data the application running on the server side to the application running on the client side over the communication network, the optional data being unnecessary for an application of the client to function correctly, and the compulsory data delivered by the at least one compulsory multicast channel being core data employed for correct functioning of both the application running on the server side and application running on the client side.

* * * * *